Nov. 17, 1959
W. T. GRUBB, JR
2,913,511
FUEL CELL
Filed June 29, 1955
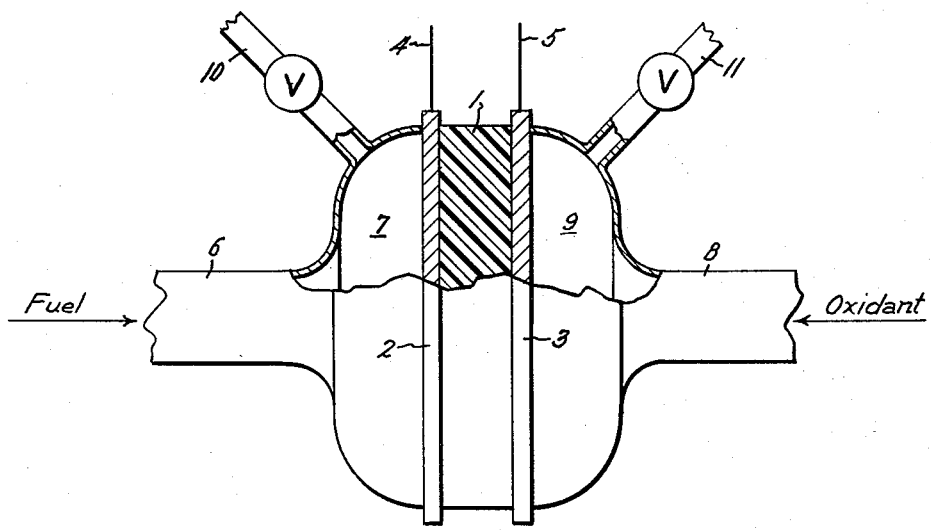
*Inventor:*
William T. Grubb, Jr.,
by Paul A. Frank
His Attorney.

United States Patent Office 2,913,511
Patented Nov. 17, 1959

2,913,511

FUEL CELL

Willard T. Grubb, Jr., Schenectady, N.Y., assignor to General Electric Company, a corporation of New York Application June 29, 1955, Serial No. 518,749

10 Claims. (Cl. 136—86)

This invention relates to gaseous fuel cells. More particularly, this invention relates to gaseous fuel cells in which the electrolyte comprises a membrane formed from an ion exchange resin.

In the presently employed methods of generating electrical energy, certain inefficiencies are recognized. Thus, where electrical energy is generated from the heat of chemical reactions, a fuel is generally oxidized by air and the chemical energy of the fuel is converted into heat and mechanical energy. This heat and mechanical energy is then used in gas turbines or steam turbines connected to conventional dynamoelectric generators to provide the electrical energy needed. The first inefficiency found in this method of electricity generation is in the conversion of the chemical energy of the fuel into electrical energy. It is estimated that the overall efficiency of this conversion is considerably less than 50 percent. In order to avoid this particular inefficiency factor in electricity generation, it has been proposed to employ fuel cells to convert the chemical energy of the fuel directly into electrical energy without the conversion of the energy of the fuel into heat and mechanical energy. From this description of the function of a fuel cell, it can be seen that a fuel cell is a device for directly converting the chemical energy of a fuel such as coal, coke, hydrogen, carbon monoxide, methane, etc., into electrical energy.

Another inefficiency found in current methods of producing electrical energy is that no satisfactory method of storing electrical energy is known, i.e. electrical energy must be produced as it is required and generation capacity must be equal to peak demand. To obviate this difficulty the use of fuel cells has again been suggested. Electrical energy which is produced over and above the demand at the time of production may be stored by converting the electrical energy directly into chemical energy. When the demand for electricity is greater than generating capacity this chemical energy can be converted back into electrical energy. Specifically, it has been suggested that electrical energy be employed in the electrolysis of water to produce hydrogen and oxygen. The hydrogen and oxygen can then be employed in a fuel cell to reconvert the energy of these gases back into electrical energy.

Although the use of fuel cells is thus recognized, no fuel cell satisfactory for this purpose has been developed prior to the present invention. Presently known fuel cells are disadvantageous in that they require high pressures and high temperatures for their operation and they have relatively low volume efficiencies. Volume efficiency is the amount of electrical power which can be obtained from a unit volume of a fuel cell.

An object of the present invention is to provide a fuel cell operable at room temperature and atmospheric pressure, which employs an ion exchange resin membrane as the electrolyte.

A further object of this invention is to provide a fuel cell having a high volume efficiency.

These and other objects of my invention are accomplished by providing a fuel cell comprising an ion exchange resin membrane positioned between two electrodes, with means for supplying a gaseous fuel to one of the electrodes and means for providing a supply of oxidant gas to the other electrode.

My invention may be better understood by reference to the following description taken in connection with the drawing which is a view, partly in section, of a fuel cell within the scope of the present invention.

These fuel cells are based on my discovery that an ion exchange resin membrane is an outstanding electrolyte for use in fuel cells since the electronic conduction of the membrane is negligible, electrolytic conductance of the membrane is high, the membranes are permeable to one kind of ion while resisting the passage of uncharged gases and ions of opposite charge, the membranes have high mechanical strength and the membranes are readily available in dimensions of large area and small thickness which leads to favorable cell geometry, and the cells produced with these membranes are operable at room temperature and atmospheric pressure while having a high volume efficiency.

The ion exchange resin membranes employed in the present invention are ion exchange resins in sheet form. These resins include in their polymeric structure dissociable ionizable radicals, one ionic component of which is fixed into or retained by the polymeric matrix with at least one ion component being a mobile and replaceable ion electrostatically associated with the fixed component. The ability of the mobile ion to be replaced under appropriate conditions by other ions, imparts ion exchange characteristics to these materials.

As is well known, ion exchange resins are prepared by copolymerizing a mixture of ingredients, one of which contains an ionic substituent. In the case of cation exchange resins, these ionic groups are acidic groups such as the sulfonic acid group, the carboxyl group, and the like. In the case of anion exchange resins, the ionic group is basic in nature and may comprise amine groups, quaternary ammonium hydroxides, the guanidine group, the dicyandiamidine group, and other nitrogen-containing basic groups. In the case of these anion exchange resins, the ionizable group is attached to a polymeric compound such as a phenol-formaldehyde resin, a polystyrene-divinylbenzene copolymer, a urea-formaldehyde resin, a melamine-formaldehyde resin, a polyalkylene-polyamine-formaldehyde resin, etc. Thus, a typical cation exchange resin may be prepared by copolymerizing m-phenolsulfonic acid with formaldehyde. A typical anion exchange resin may be prepared by copolymerizing a mixture of phenol, formaldehyde and triethylenetetramine. The preparation and properties of a number of different types of cation exchange resins are described throughout the literature and in particular in "Ion Exchange," Nachod, Academic Press, Inc., New York (1950); "Ion Exchange Resins," Kunin and Myers, John Wiley & Sons, Inc., New York (1950); "Styrene, Its Polymers and Copolymers and Derivatives," Boundy and Boyer, Reinhold, New York (1950); and in U.S. patents such as 2,366,007—D'Alelio; 2,366,008—D'Alelio; 2,663,702—Kropa; 2,664,379—Hutchinson; 2,678,306—Ferris; 2,658,042—Johnson; 2,681,319—Bodamer; 2,681,-320—Bodamer.

The formation of these ion exchange resins into membrane or sheet form is also well known in the art. In general, these membranes are of two forms, the mosaic type in which granules of ion exchange resin are incorporated into a sheet-like matrix of a suitable binder such as a binder of polyethylene or polyvinyl chloride, and the continuous ion exchange resin membrane in which the entire membrane structure has ion exchange characteristics. The latter type of membrane may be formed by molding or casting a partially polymerized ion exchange resin into sheet form. The formation of these ion exchange membranes is described, for example, in "Amberplex Ion Permeable Membranes," Rohm and Haas Co., Philadelphia (1952), and in the references mentioned in this publication. In addition, the preparation of a plurality of different types of ion exchange membranes is described in Patent 2,636,851—Juda et al. and 2,702,272—Kasper.

As a general rule, ion exchange resins are formed in aqueous solutions or emulsions of various types of organic compounds so that when the membrane is formed it is substantially saturated with water. Thus, a phenol sulfonic acid-formaldehyde resin is found to contain a plurality of reactive sites consisting of —$SO_3H$ radicals attached to the resin matrix with sufficient water being held in the resin matrix by Van der Waals force so that the $H^+$ ion is extremely mobile in the resin matrix. In this form the resin is described as being hydrated. The term "hydrated" means that the resin contains enough water to substantially saturate the resin but not enough to keep the resin wet. Although the amount of water in a hydrated ion exchange resin may vary within wide limits depending on the particular composition of the resin and its physical structure, I have found that the hydrated resins employed in the present invention generally contain from about 15 to 50 percent, by weight, of water held in the resin by secondary Van der Waals forces. This water of hydration cannot be removed from the resin by mechanical forces, but can be removed from the resinous material by subjecting the resin to a vacuum of several microns.

The thickness of the membranes employed in the practice of the present invention is not critical and may vary from several mils up to a quarter of an inch or more. However, for economic reasons, the membrances are preferably as small as possible, such as, for example, from about 2 to 30 mils.

Although a number of different types of electrodes are suitable for use in the cells of the present invention, the electrode should be one which is a conductor, which will adsorb the fuel employed and which will act as a catalyst for the electrode reaction. Suitable electrodes meeting these requirements are well known and many are described for example, in "Catalysis, Inorganic and Organic," Berkman, Morrel, and Egloff, Reinhold Publishing Co., New York (1940). Suitable electrode materials include electrodes formed from metals of group VIII of the periodic table such as rhodium, palladium, iridium and platinum. Other suitable metals include nickel and copper. In addition to the electrodes formed of these metals, the electrodes can be formed of platinum or palladium black which is deposited on a base metal such as stainless steel, iron, nickel and the like. In addition, suitable electrodes may be formed from metal oxides or from carbon which is activated with platinum or palladium or with oxides of iron, magnesium, cobalt, copper, etc. These electrode materials may be used in sheet form or in the form of screens, meshes, or other types of porous bodies. The thickness of the electrode is not critical, sizes of from 1 mil up to ¼ inch or more having been operated satisfactorily as electrodes.

For a more complete understanding of the gaseous fuel cells of the present invention, reference is made to the drawing which is a schematic drawing of a fuel cell of the present invention. This cell comprises an ion permeable membrane 1 positioned between and in electrical contact with electrodes 2 and 3. Membrane 1 is the sole electrolyte in the gaseous fuel cell. Leads 4 and 5 connected to electrodes 2 and 3, respectively, are used to deliver electrical current to the apparatus being operated by the cell. Fuel gas is supplied to electrode 2 through inlet 6 and chamber 7. A valved outlet 10 is provided from chamber 7 to exhaust any impurities which enter the chamber from the fuel gas or any inert materials which are a product of reaction of the fuel gas. The oxidant gas which may be oxygen or air is admitted into chamber 9 through inlet 8. Chamber 9 contains a valved outlet 11 for the withdrawal of impurities in the oxidant gas. Thus, where the oxidant is air, outlet 11 is employed to remove the nitrogen which builds up in chamber 9.

In the cell of the drawing where the membrane 1 is a cation permeable membrane, having $H^+$ ions as the mobile ion, where the fuel gas is hydrogen and the oxidant is air, the overall cell reaction is the oxidation of hydrogen to water. The respective reactions at the anode 2 and cathode 3 are as follows:

(1) $\quad H_2 = 2H^+ + 2e$
(2) $\quad \frac{1}{2}O_2 + 2H^+ + 2e = H_2O$

Where hydrogen is used as a fuel gas it is noted that the product of the overall cell reaction is water. It has been found that this water will form in the cation permeable membrane. Since the membrane is substantially saturated prior to the operation of the cell, this water accumulates on the edges of the membrane. In the usual operation of the cell normal evaporation is sufficient to remove this water as it is formed. However, means may be provided, if desired, for collecting the water as it is formed and carrying it away from the cell. Thus, the water formed may be allowed to drop off the membrane into a collection trough or the membrane may be subjected to a current of air or other gas to sweep the water away from the membrane as it is formed. Where the oxidant employed in the cell is air, the nitrogen of the air does not enter into the cell reaction and begins to accumulate in chamber 9. For this reason it is desirable to bleed off a portion of the gases from chamber 9 through valved outlet 11 so as to maintain the concentration of oxygen in chamber 9 at a level somewhat near the level found in air, i.e. about 20 percent by volume.

When the cell just described employs an anion permeable resin membrane with hydrogen and oxygen, the overall reaction is again the oxidation of hydrogen to water with the electrode reactions being:

(3) $\quad H_2 + 2OH^- = 2H_2O + 2e$
(4) $\quad \frac{1}{2}O_2 + H_2O + 2e = 2OH^-$ Where a cell corresponding to the drawing is constructed with an anion exchange resin as the electrolyte, with carbon monoxide as the fuel gas and oxygen as the oxidant, the overall cell reaction is the oxidation of carbon monoxide to carbon dioxide. Since the carbon dioxide forms in the area of chamber 7, it is desirable to remove the carbon dioxide as it is formed by bleeding through valved outlet 10 a portion of the gas in chamber 7. In the cell just described the anode and cathode reactions are as follows:

(5) $\quad CO + 2OH^- = CO_2 + H_2O + 2e$
(6) $\quad \frac{1}{2}O_2 + H_2O + 2e = 2OH^-$ Where the fuel gas is a hydrocarbon such as methane, the cell of the drawing may contain either an anion permeable membrane or a cation permeable membrane. Where a cation permeable membrane is employed with methane and oxygen, the overall cell reaction is the oxidation of the methane to carbon dioxide and water. The carbon dioxide, which is formed in the area of chamber 7, may be withdrawn through valved outlet 10. The water formed in the reaction is found on the surface of the cation permeable membrane and may be removed by methods previously described. The respective anode and cathode reactions of this cell are as follows:

(7) $\quad CH_4 + 2H_2O = CO_2 + 8H^+ + 8e$
(8) $\quad 2O_2 + 8H^+ + 8e = 4H_2O$ Where the fuel gas is methane, the oxidant is oxygen and the membrane 1 employed is anion permeable, the overall cell reaction is still the oxidation of methane to carbon dioxide and water. In the latter case somewhat different anode and cathode reactions are found. These reactions are listed below.

(9) $\quad CH_4 + 8OH^- = CO_2 + 6H_2O + 8e$
(10) $\quad 2O_2 + 4H_2O + 8e = 8OH^-$ The following examples are illustrative of the practice of my invention and are not for purposes of limitation.

In Examples 1 to 8 which follow, the properties of a number of fuel cells are described in which the ion permeable membrane is a cation permeable membrane obtained from Rohm and Haas Company under the trade name of "Amberplex C–1" cation permeable membrane. These membranes are obtained by first polymerizing a mixture of about 92 parts by weight of styrene and 8 parts by weight of divinyl benzene and comminuting the resulting polymeric material until finely divided particles are obtained. One hundred parts by weight of this finely divided polymerizate is then sulfonated by reacting it with about 175 parts of chlorosulfonic acid for three minutes at the reflux temperature of the mass and then for about 50 hours at room temperature. The sulfonated product is then treated with a large volume of water to destroy the excess of chlorosulfonic acid and any acid chloride that is formed. This results in a sulfonated resin containing 3.1 milliequivalents of mobile hydrogen ions per gram of resin. Two parts by weight of the dry sulfonated resin is then mixed with 1 part by weight of polyethylene and the resulting mixture is pressed into sheet or membrane form. The resulting membrane contains 2.1 milliequivalents of mobile hydrogen ions per gram of dry membrane. When the membrane is soaked in water, the resulting hydrated membrane contains 45 percent by weight of water. In all of the examples the membrane was employed in this hydrated form. In all of the examples the fuel is hydrogen and the oxidant is oxygen, both of the gases being supplied at room temperatures and about atmospheric pressure.

Example 1

A cell is constructed similar to that shown in the drawing employing a 25 mil thick Amberplex C–1 cation permeable membrane positioned between two 5 mil palladium sheets. The area of contact between the electrodes and the membrane is 2 square centimeters. When hydrogen is supplied to the anode and oxygen is supplied to the cathode, this cell has an open circuit voltage of 0.9 volt and delivers a current of 10 microamperes at 0.1 volt.

Example 2

A cell corresponding to the drawing is prepared from a 25 mil sheet of Amberplex C–1 cation exchange resin positioned between 0.5 mil sheets of platinum foil to give a cell in which the contact area between the electrodes and the ion exchange membrane is 25 square centimeters. When this cell is supplied with hydrogen and oxygen at room temperature and one atmosphere the open cell voltage is found to be about 0.95 volt and the cell delivers a current of 10 milliamperes at 0.65 volt.

Example 3

The cell of this example differs from the cell of Example 2 only in that the electrodes are formed of 0.08 mil platinum foil. This cell has an open circuit voltage of about 0.86 volt and delivers a current of 10 milliamperes at a voltage of about 0.65 volt.

Example 4

A cell is prepared corresponding to that shown in the figure using a 25 mil thick sheet of the cation exchange membrane positioned between two platinized nickel screen electrodes to give a cell with a contact area of 25 square centimeters. The platinized nickel screen consists of 6 mil, 150 x 150 mesh nickel which has been platinized by dipping it into a platinizing solution consisting of 3 percent chloroplatinic acid plus 0.05 percent lead acetate in water. The nickel becomes coated with a black layer of finely divided platinum after this treatment. When hydrogen and oxygen at one atmosphere and room temperature are supplied to this cell, the open circuit voltage is about 0.95 volt and the cell delivers a current of 10 milliamperes at a potential of about 0.87 volt. This cell also delivers about 35 milliamperes at a potential of about 0.6 volt.

Example 5

The cell of this example differs from that of Example 4 in that the nickel screen is rolled out to a 4 mil thickness prior to platinizing and the membrane has a thickness of about 50 mils. This cell has an open circuit voltage of about 0.91 volt and delivers a current of 10 milliamperes at about 0.83 volt, and a current of about 35 milliamperes at about 0.65 volt.

Example 6

The cell of this example differs from the cell of Example 4 in that the nickel screen is rolled down to about 2 mil thickness prior to platinizing. This cell has an open circuit voltage of about 0.98 volt, delivers a current of 10 milliamperes at about 0.88 volt, and delivers a current of about 35 milliamperes at a potential of about 0.82 volt.

Example 7

The cell of this example differs from the cell of Example 1 in that both electrodes are formed of 5 mil platinum foil. This cell delivers a current of 10 milliamperes at 0.1 volt.

Example 8

The cell of this example differs from the cell of Example 6 in that the electrodes are coated with palladium black prior to rolling. This palladium black coating is formed by dipping the nickel screen into an aqueous solution of 3 percent of $H_2PdCl_4$ and 0.02 percent lead acetate. This cell has an open circuit voltage of 0.9 volt and delivers 35 milliamperes at a potential of 0.7 volt.

Example 9

This example describes the use of a fuel cell in which the ion permeable membrance is an anion permeable membrane. The specific membrane employed is Amberplex A–1 ion permeable membrance (Rohm and Haas Co.). This membrane is a 95 percent styrene, 5 percent divinyl benzene copolymer which has been chloromethylated with chloromethyl ether. This chloromethylated product is then aminated with trimethyl amine to form the corresponding quaternary ammonium chloride. This resin is then reacted with aqueous potassium hydroxide to form a hydrated anion exchange resin in which the mobile cations are hydroxide ions. Two parts by weight of this resin in powdered form are intimately mixed with 1 part by weight of polyethylene and the resulting mixture is molded into sheet form to give the anion permeable membrane. This membrane contains about 35 percent water and contains about one milliequivalent of hydroxide ions per gram of membrane. In this example a 25 mil sheet of this membrane having a surface area on each side of 25 square centimeters is positioned between two platinized nickel electrodes such as are described in Example 6. This cell has an open circuit potential of 0.8 volt and delivers a current of 10 milliamperes in a circuit containing a 10 ohm resistance.

Example 10

In this example a fuel cell is prepared using the 25 mil sheets of Amberplex A–1 anion exchange resin described in the preceding example. The electrodes employed are impregnated porous carbon electrodes. These electrodes are prepared by saturating ¾ inch disks of Carbocel–40 porous carbon with 100 ml. of water which contains 10 grams of silver nitrate, 5 grams of ferric nitrate, 1 gram of cupric nitrate and 0.1 gram of ammonium vanadate. The saturated electrodes are then heated to 300° C. for 30 minutes to remove dissolved water and convert the nitrates to oxides. The resulting cell has voltage characteristics corresponding to the cell of Example 9 when hydrogen is employed as the fuel and oxygen as the oxidant.

What I claim as new and desire to secure by Letters Patent of the United States is:

1. A gaseous fuel cell comprising a hydrated ion exchange resin membrane positioned between and in direct contact with a pair of gas permeable electrodes, said membrane being the sole electrolyte in said cell, means for supplying a fuel gas to one of said electrodes and means for supplying a gaseous oxidant to the other of said electrodes.

2. The fuel cell of claim 1 in which the electrodes are formed of platinum.

3. The fuel cell of claim 1 in which the electrodes are formed of platinized nickel screen.

4. The fuel cell of claim 1 in which the mobile ion in the ion exchange resin membrane is the hydrogen ion.

5. The fuel cell of claim 1 in which the mobile ion in the ion exchange resin membrane is the hydroxyl ion.

6. The fuel cell of claim 1 in which the fuel gas is hydrogen.

7. The fuel cell of claim 1 in which the oxidant is oxygen.

8. A gaseous fuel cell comprising a hydrated ion exchange resin membrane in which the mobile ion is the hydrogen ion, said membrane being positioned between and in direct contact with a pair of gas permeable electrodes, said membrane being the sole electrolyte in said cell, means for supplying hydrogen to one of said electrodes and means for supplying oxygen to the other of said electrodes.

9. The fuel cell of claim 8 in which the electrodes are formed of platinum.

10. The fuel cell of claim 8 in which the electrodes are formed of platinized nickel screen.

References Cited in the file of this patent

UNITED STATES PATENTS

| Number | Name | Date |
|---|---|---|
| 655,110 | Plecher | July 31, 1900 |
| 1,182,759 | Emanuel | May 9, 1916 |
| 2,070,612 | Niederreither | Feb. 16, 1937 |
| 2,276,188 | Greger | Mar. 10, 1942 |
| 2,607,809 | Pitzer | Aug. 19, 1952 |
| 2,624,768 | Toulmin | Jan. 6, 1953 |
| 2,635,127 | Yardney | Apr. 14, 1953 |
| 2,636,851 | Juda | Apr. 28, 1953 |
| 2,700,063 | Manecke | Jan. 18, 1955 |
| 2,716,670 | Bacon | Aug. 30, 1955 |
| 2,744,009 | Kirkwood | May 22, 1956 |

FOREIGN PATENTS

| Number | Country | Date |
|---|---|---|
| 521,773 | Great Britain | May 30, 1940 |